T. G. McGIRR.
WRAPPING MACHINE.
APPLICATION FILED NOV. 8, 1905.

949,801.

Patented Feb. 22, 1910.
4 SHEETS—SHEET 1.

Witnesses
Chas. A. Beard
A. R. Hunter

Inventor
Theodore G. McGirr
By his Attorney

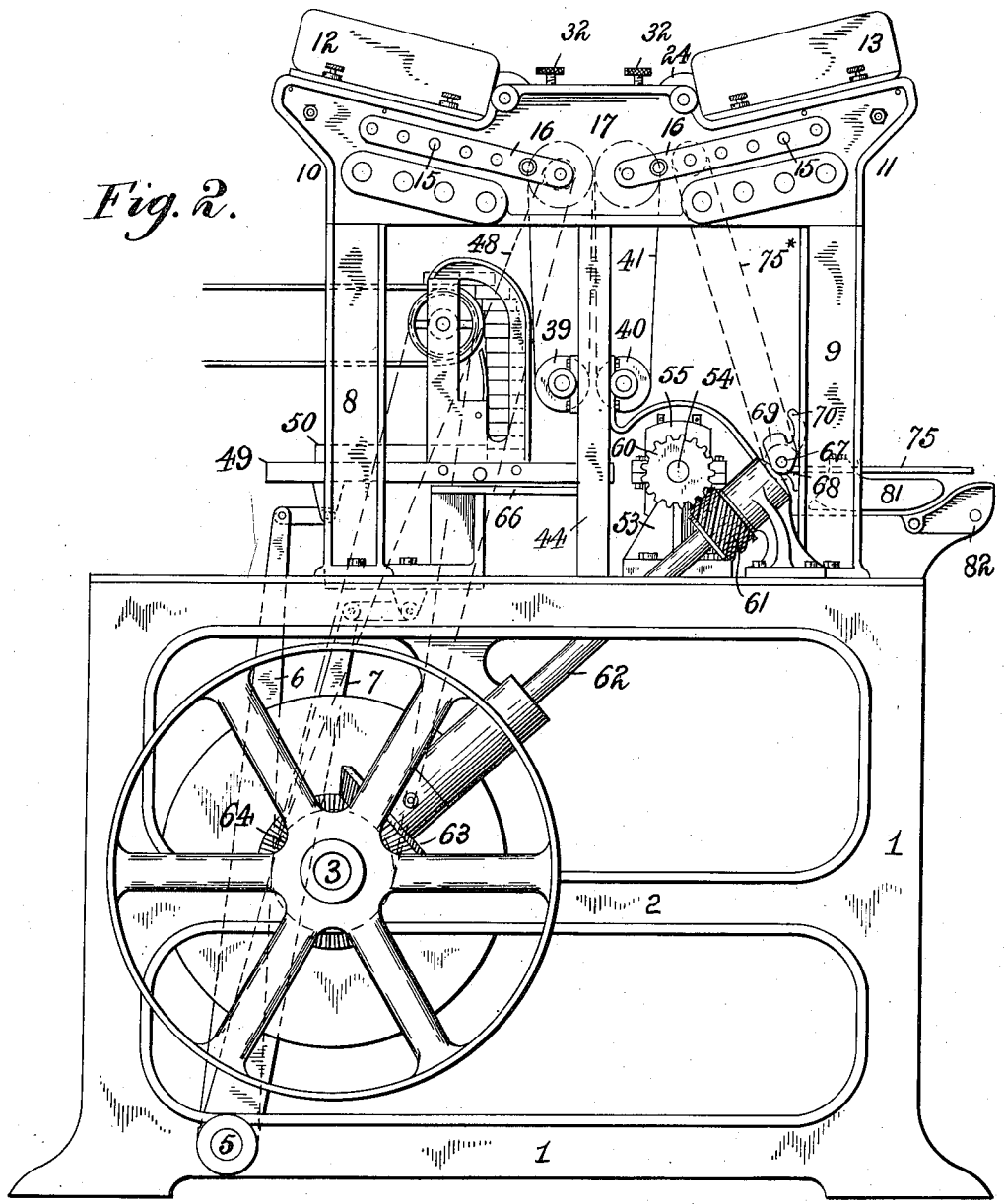

T. G. McGIRR.
WRAPPING MACHINE.
APPLICATION FILED NOV. 8, 1905.
949,801.
Patented Feb. 22, 1910.
4 SHEETS—SHEET 3.
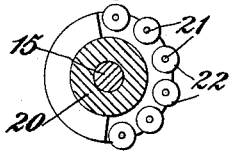
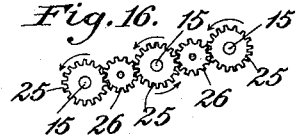
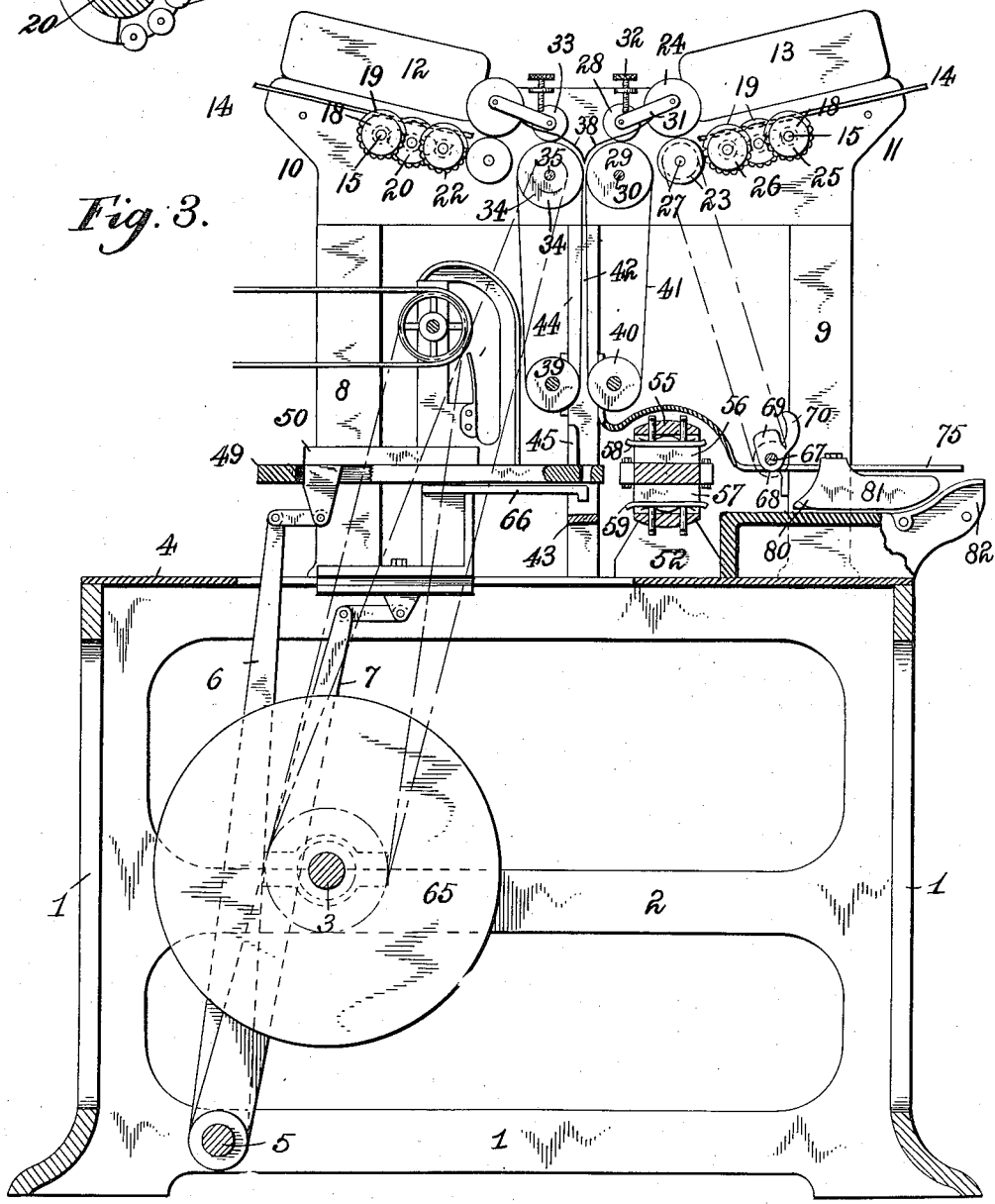
Witnesses
Chas. A. Beard
A. R. Hunter
Inventor
Theodore G. McGirr
By his Attorney
Robt. P. Hauss T. G. McGIRR.
WRAPPING MACHINE.
APPLICATION FILED NOV. 8, 1905.

949,801.

Patented Feb. 22, 1910.
4 SHEETS—SHEET 4.

Witnesses
Chas. A. Beard
A. R. Hunter.

Inventor
Theodore G. McGirr
By his Attorney
Robt. F. Hairs

UNITED STATES PATENT OFFICE.

THEODORE G. McGIRR, OF NEW YORK, N. Y., ASSIGNOR TO ACME WRAPPING MACHINE COMPANY, OF NEW YORK, N. Y., A CORPORATION OF NEW YORK.

WRAPPING-MACHINE.

949,801.  Specification of Letters Patent.  Patented Feb. 22, 1910.

Application filed November 8, 1905. Serial No. 286,376.

*To all whom it may concern:*

Be it known that I, THEODORE G. MCGIRR, a citizen of the United States, residing in the city, county, and State of New York, have invented a new and useful Improvement in Wrapping-Machines, of which the following is a description.

My invention relates to machines for applying one or more wrappers each to articles, and more particularly to machines for applying such wrappers to many articles in succession by consecutive operations, the primary object of the invention being to secure greater efficiency and simplicity of construction and operation, to avoid breakage of goods, to deliver the goods in neat and attractive wrapped form, and to render the operations automatic throughout.

The invention consists of features of construction and combinations of devices hereinafter described and more particularly pointed out in the claims concluding this specification.

The invention is embodied in the apparatus illustrated in the accompanying drawings, forming part hereof, in which—

Figure 1:
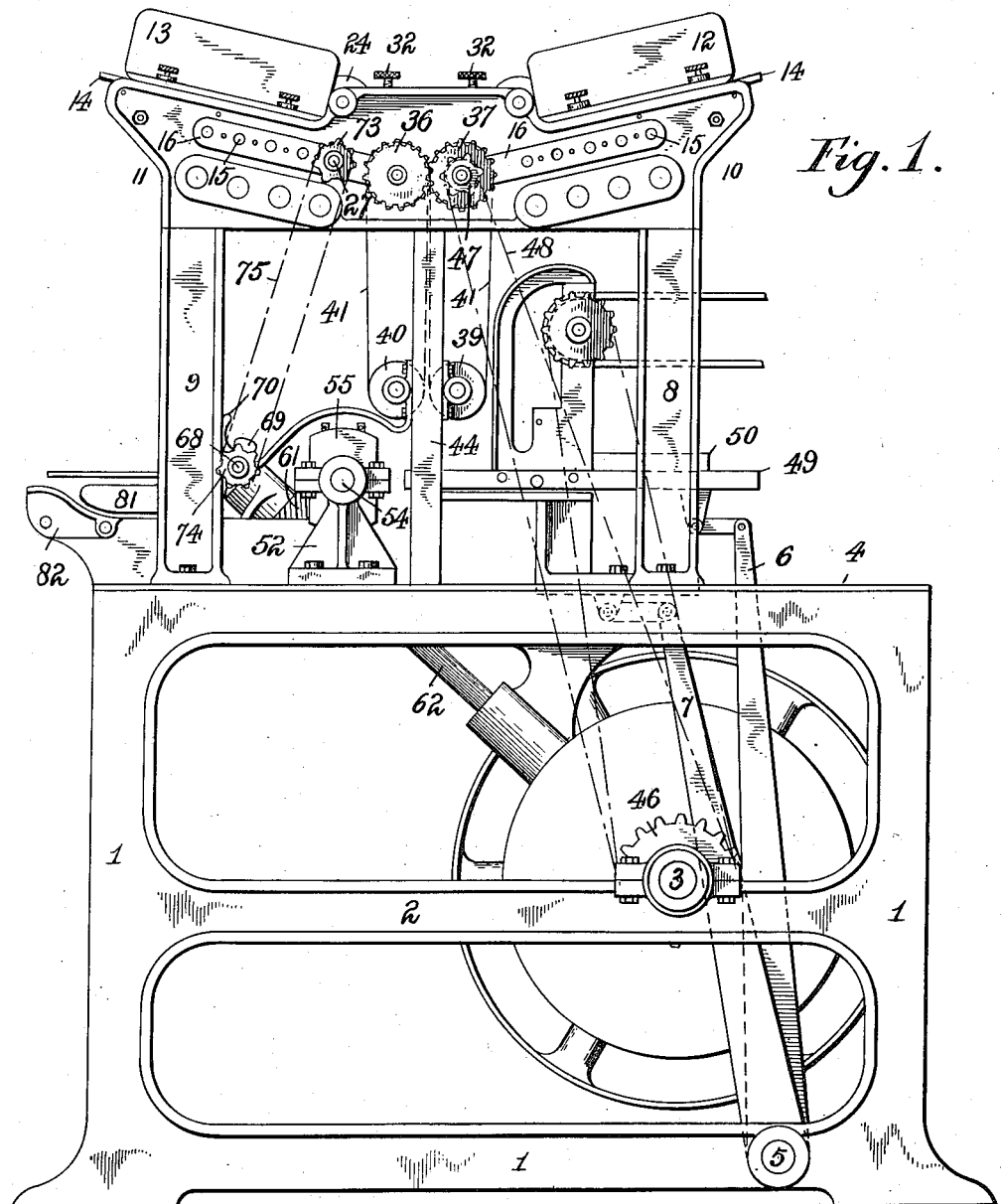
Figure 4:
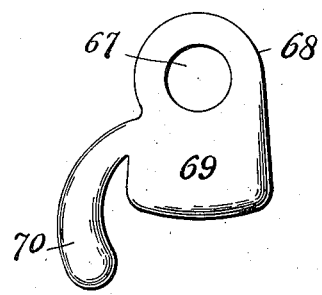
Figure 5:
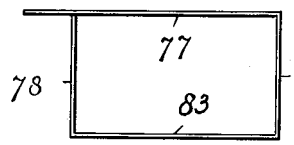
Figure 6:
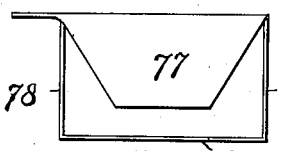
Figure 7:
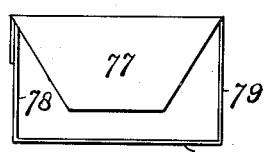
Figures 8, 9:
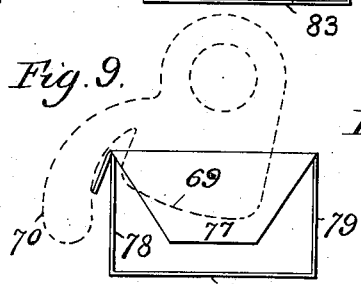
Figure 10:
Figure 11:
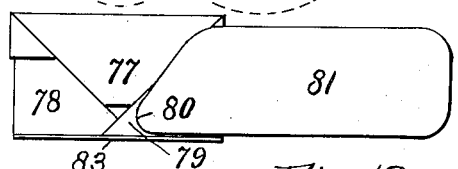
Figure 12:
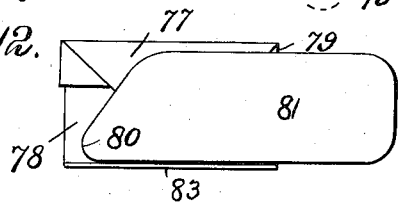
Figures 13, 14:
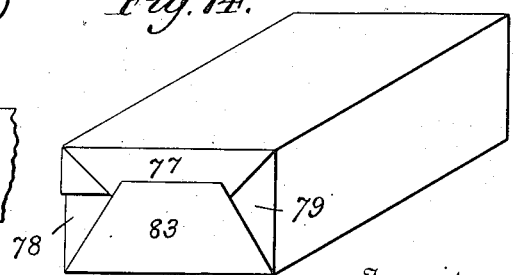

Figure 1 is a side elevation of the machine; Fig. 2 is a similar view but from the opposite side of the machine; Fig. 3 is a view from the same side as Fig. 2 but with parts omitted and others in section; Fig. 4 is an elevation of a folding-device; Figs. 5 to 8 inclusive illustrate various steps in the operation of folding the wrappers about the articles; Figs. 9, 10 and 11 are detail views illustrating the operation of the folding device shown in Fig. 4 and elsewhere; Fig. 12 is a view illustrating the tucking in of part of the wrapper-end; Fig. 13 is a similar view showing another operation; Fig. 14 is a perspective view of the completely wrapped article; and Figs. 15 and 16 are detailed views illustrating the wrapper-feeding mechanism.

The side-frames 1 are provided with intermediate rails 2 to provide bearings for the main drive-shaft 3, from which the various movable parts derive their motions. A table or top 4 is fixed to the tops of the frames 1 to provide a convenient rest and table for the operators to handle the goods upon and for other purposes. A shaft 5 is journaled in the side frames 1 near the bottoms thereof and is provided with two operating levers 6, 7. Above the table 4 are fixed frames or standards 8, 9, on which are mounted paper-feeding devices 10, 11, which devices, in the preferred arrangement, slope inwardly or toward each other as shown, since this arrangement causes the wrappers to tend to move toward the discharge-ends of their hoppers. The hoppers preferably have adjustable ends 12, 13, so that each receptacle or hopper for the wrappers may be adjusted for different-sized wrappers, which rest upon the bottoms 14 thereof. In the preferred form, the said bottoms 14 consist of strips of metal securely held in place, while immediately below the bottoms 14 are placed a series of shafts 15, journaled in bearings 16 on the side-frames 17. Upon each shaft 15 is secured one or more segmental rolls 18, which may be, and preferably are, covered with rubber 19 or other suitable frictional material. Also mounted upon the shafts 15 in between the rolls 18 are other segmental rolls 20 on the peripheries of which are a plurality of small rods 21 on which are mounted rollers 22, the function of the described construction being to assist in the operation of separating the lowermost sheets from the pack by combing them forward, so that the segmental rolls 18 with their flat-faced frictional surfaces 19 may advance the bottom sheets with more certainty and ease and feed them between the rolls 23, 24 toward the discharge-ends of the hoppers shown. The shafts 15 are geared together by the gears 25, 26 to cause said shafts to move in the required direction and manner.

The discharge roll 23 for each hopper is mounted upon a shaft 27, and coacts with the guide or gage roll 24 which is mounted eccentrically on bearings which may be adjusted so as to bring the said roll 24 closer to or farther from the roll 23 and thereby determine the thickness of paper that will pass between the rolls 23, 24. The roll 23 delivers the wrapper or wrappers between the revolving rolls 28, 29. The rolls 29 are mounted upon a shaft 30, while the rolls 28 are carried by small levers 31 which may be adjusted by means of the screws 32 to vary the pressure of the rolls 28, 29 upon each other, and, thereby, to vary the pressure upon the wrappers being fed through said rolls.

The parts marked 33, 34 and 35 correspond in construction and operation with the parts 28, 29 and 30 above described, respectively. The shafts 30 and 35 are driven at the same speed by means of the gears 36, 37 thereon and in mesh with each other as shown. The shaft 35 is driven from the main shaft 3 by a sprocket-chain 48 and wheels 46, 47. Above the rolls 29, 34 is placed a deflector 38 which is arranged to direct the wrappers down between the rolls 29, 34. Some distance below the rolls 29, 34, are rolls 39, 40, and sets of tapes 41 run upon the pairs of rolls 39, 40 and 34, 39 and form a chute or passageway 42 down which the wrappers pass from rolls 29, 34 to and between the rolls 39, 40 to a stop or cleat 43 above the table 4. The uprights 44 at each side of the machine act as side-stops or guides for the edges of the wrappers to prevent lateral displacement of the same. Below the rolls 39, 40 the uprights 44 have guides 45 attached thereto for guiding the wrappers down through the slot 51 in the platform 49. The platform 49 forms the operating table on which the articles to be wrapped are moved by a feed plunger 50, which is operatively connected to the lever 6 above named, and which slides to and fro on the top of the platform 49.

Bearings 52, 53 are attached to the top of the table 4 for the trunnions 54 of a rotary folder 55. This folder is in the form of a bar provided with two through-channels or passage-ways 56, 57, the channel 56 having a spring-pressed bar 58 and the channel 57 having a like bar 59 therein. That is, each channel has a yielding side thereto, whereby goods of non-uniform thicknesses may be inserted in said channels by the plunger 50 and may there be held by the said frictional spring-pressed members 58, 59, while allowing an ejector 66 to remove from said channels the goods therein placed by said plunger
50. The ejector 66 is connected to and operated by the lever 7 aforesaid. The folder 55 is rotated by means of a spiral gear 60 on one of its trunnions, which meshes with a similar gear 61 on the shaft 62. The shaft 62 is driven from the shaft 3 by means of intermittently-acting bevel gears 63, 64, whereby the rotary folder 55 is rotated half a turn at a time and is allowed to stand at rest for a suitable interval while the plunger 50 and ejector 66 are acting as hereinafter set forth.

The article, as it is forced onward by the plunger 50, comes in contact first with the wrapper fed down the chute 42 and carries it or them with it into the channel 56 (or 57, according to which happens to be uppermost at the time), whereby the wrapper is folded about the front, top and bottom of the article; then the plunger 50 is withdrawn, and thereafter the folder 55 makes half a turn, thereby bringing below the channel that was uppermost and reversing the position of the article, whereupon the ejector 66 advances (as does plunger 50) and pushes out the article on to a table where it is subjected to the action of other folding and tucking devices. A guide plate 75 coacts with the folder 55 to lay the ends of the wrapper against the article as the folder makes a half turn as stated.

The ejector-lever 6 is operated by a cam upon the shaft 3, and the ejector 66 is operated by a similar cam upon said shaft; said cams are grooved in disks 65 fast on said shaft 3, and are shaped to move their respective levers 6, 7 at the proper times and in the desired manners.

To the rear of the folder 55 is a shaft 67, suitably journaled in the framework of the machine, and having fast thereon the endtuckers or folders 69, 70 of unequal radii and united by eyes 68 with the said shaft. The tucker 69 is in the form of a broad round-edged blade, while the tucker or folder 70 is in the form of a finger projecting beyond the outer end of the folder 69.

In operation, the folder 70 follows or is behind the folder 69, as indicated by the arrow in Fig. 4 which shows the direction of rotation of the shaft 67. The curve of the outer end of the tucker 69 is on a radius greater than the distance from that outer end to the center of the shaft 67, as shown in the drawings. The shaft 67 is driven by a sprocket 75* from a sprocket wheel 73 on a shaft 27, there being a sprocket wheel 74 on the said shaft 67 for the chain 75*. The tucker 69 lays the top overhang 77 of the end of the wrapper down against the end of the article, as indicated in Fig. 9, after which the tucker 70 folds in the triangular part 78 left when the over-hang 77 is laid down, as indicated in Fig. 10, the article being at rest the while. Thereafter, a following article, ejected by the ejector 66, pushes onward the one just acted upon by the tuckers 69, 70 as above described, and the forward triangular end 79 is laid in by the fixed tucker 80, as indicated in Figs. 11 and 12, the said tucker 80 being the end of the retainer 81. It will be understood that the described constructions are duplicated at each end of the article to be wrapped, so as to fold in the overhangs at each end. The retainers, then, act to hold the folded in ends 77, 78, 79, while the remaining ends 83 are being lifted or laid in against the ends of the article by the end-wings 82, as indicated in Fig. 13. These last-named folders 82 are yieldingly held in place on the machine, and score or break the creases in the wrappers so as to insure that they will retain the better their folded shapes. The completely folded article is shown in Fig. 14.

The operation of the apparatus is as follows:—The articles $a$ which are to be wrapped are run into the chute $b$ by a belt $c$ or other suitable means, and stack up therein in front of the plunger 50. The wrappers, as tissue, oiled paper, foil, etc., are placed on the hopper bottoms 14 and are fed from the bottoms of the stacks at intervals by the intermittently-acting feed-rolls 18, the rolls 31 preventing the feeding of more than is desired; the wrappers (where two are used) meet at the rolls 29, 34 and are fed down together between the tapes 41 and to the stop 43, by which they are momentarily arrested. At the moment the wrappers reach the said stop 43, the ejector pushes the bottom article from the chute $b$ and against the said wrappers at about the middle thereof, and the article carries the wrapper onward with it into whichever of the passages 56, 57 happens at the time to be uppermost, thus doubling the wrapper about the front, top and bottom of the article and leaving the wrapper sticking out at each end of the article and also at the rear thereof. On the withdrawal of the plunger 50, the folder 55 turns over and the guard 75 lays the rear of the wrapper against the rear of the article as the folder turns over. When the said folder 55 has made a half turn and stopped, the ejector 66 advances and pushes the article out of the passageway it is in and under the shaft 67, whereupon the article stops as the ejector 66 returns to the left in Fig. 3, and the tuckers 69, 70 then proceed to lay the parts 77 and 78 as shown in Figs. 9 and 10. At the next operation another article goes through the described cycle of operations, with the additional fact that it pushes ahead of it the preceding article from under the shaft 67 and that at such advance of said preceding article, the ends 79 are laid in against the end of the article as indicated in Figs. 11 and 12 and that thereafter the ends 83 are lifted up against the ends as indicated in Fig. 13. And so on indefinitely with other articles.

It will be understood that the plunger 50 inserts an article in a channel simultaneously, or nearly so, with the ejection by ejector 66 of another article from another channel.

What I claim as new and desire to secure by Letters Patent of the United States is—

1. In a wrapping machine, the combination with a feed-plunger, of a rotary folder provided with a plurality of through passages for receiving the articles, a guard for laying the projecting wrapper-edges left by said plunger next itself, an ejector coacting with said passageways after they are turned away from the feed-plunger, rotary tuckers of unequal radii for laying in the top and back parts of the wrapper at the ends of the article, and means for laying in the front and bottom parts of said wrapper-ends.

2. An improvement in wrapping machines comprising a support for the article to be wrapped, a duplex wrapper-feeding mechanism, a rotary folder, a plunger for depositing the article in said folder, an ejector for discharging said article from the rotary folder, rotary tuckers of unequal radii for acting upon the discharged article, and means for actuating said plunger and ejector in time with each other.

3. An improvement in wrapping-machines comprising a support for the article to be wrapped, a rotary folder having channels normally in line with and normally out of line with said support, pressure-members in said channels, means for inserting the article in the channel in line with said support, means for discharging the article from said channel when the same is not in line with said support, and tuckers of unequal radii for acting upon the article after its discharge from said rotary folder.

4. In a wrapping machine, the combination of a rotary folder provided with through-channels or passageways at right angles to the axis of rotation, means for placing articles and wrappers thereon in said channels, and means for ejecting said articles and wrappers therefrom.

5. In a wrapping machine, the combination of a rotary folder provided with through channels or passageways at right angles to axis of rotation, means for placing articles and wrappers thereon in said passageways, and an ejector on the same side of said folder as said placing-means for ejecting them therefrom.

6. In a wrapping machine, a rotary folder provided with a plurality of through-channels at right angles to the axis thereof, combined with a feeding-plunger and an ejector acting from the same side of said folder as said feeding-plunger.

7. In a wrapping machine, the combination of a rotary folder provided with a plurality of through-channels at right angles to the axis thereof, an article-feeding plunger, means for feeding wrappers to a position intersecting the path of the articles to said folder, an ejector acting from the same side of said folder as said feed-plunger, and means for folding down the end of the wrappers.

8. In a wrapping machine, a rotary folder provided with a plurality of through-channels or passageways, a feed-plunger, an ejector, rotary tuckers of unequal radii for acting on different parts of the ends of the wrapper to lay the same, and means for laying-in the remainder of said wrapping-ends.

In testimony whereof, I hereunto sign my name in the presence of two subscribing witnesses.

THEODORE G. McGIRR.

Witnesses:
M. B. MEEHAN,
W. O. GILES.